June 2, 1953  H. R. POMEROY  2,640,512
BELT DRIVE

Filed Oct. 29, 1947  2 Sheets-Sheet 1

INVENTOR.
HAROLD R. POMEROY.
BY:
ATTORNEY.

June 2, 1953  H. R. POMEROY  2,640,512
BELT DRIVE
Filed Oct. 29, 1947  2 Sheets-Sheet 2

INVENTOR:
HAROLD R. POMEROY.
BY: *Edw. T. Newton*
ATTORNEY

Patented June 2, 1953

2,640,512

UNITED STATES PATENT OFFICE 2,640,512

BELT DRIVE

Harold R. Pomeroy, Akron, Ohio, assignor to Kut-Kwick Tool Corp., Brunswick, Ga., a corporation of Georgia Application October 29, 1947, Serial No. 782,727

4 Claims. (Cl. 143—43)

My invention relates to belt drives incorporating a belt connecting a driving pulley and a driven pulley, and has particular reference to a belt drive in which the relation of the pulleys may be changed from open drive position to angular drive position.

An object of my invention is to provide a belt drive in which the belt tension may be accurately adjusted.

Another object of my invention is to provide a belt drive in which the belt tension in the angular drive is substantially the same as in the open drive.

Another object of my invention is to provide a belt drive in which the belt tension is accurately controlled at varying loads.

Another object of my invention is to provide a belt drive in which the angle at which the belts leave and approach the pulleys is maintained at an optimum ratio.

Another object of my invention is to provide a belt drive with an improved mounting for the motive power means.

Another object of my invention is to provide a belt drive with an improved arrangement of pulleys adapted for shifting from open drive to angular drive and vice versa.

A further object of my invention is to provide a belt drive which is simple and rugged in construction, efficient in operation, inexpensive to manufacture and in which the belts have long life.

Still further objects and advantages of my invention will be apparent from the following description taken in connection with the accompanying drawing in which my invention is shown incorporated in a portable power driven saw suitable for cutting trees or fallen timber and the like. The saw blade is in a vertical position when cutting logs, and is rotated to a horizontal position for felling trees.

The drive for a saw of the above mentioned type is usually carried forward from an engine pulley by means of one or more V-belts abreast, the driven pulley of the saw receiving a straight or direct belt drive when the saw blade is in the vertical position. However, when the blade is turned to the horizontal position, twisting the belt drive, the altered position of the driven pulley departs from alignment with the driving pulley, so that the twist of the belts is distorted and the tension in the belts is altered. Consequently, excessive friction is developed, maximum power is lost, and the belts fray and wear out in a short time. According to my invention these difficulties are obviated.

In the accompanying drawing, like characters of reference designate corresponding parts in the several views.

Figure 1:
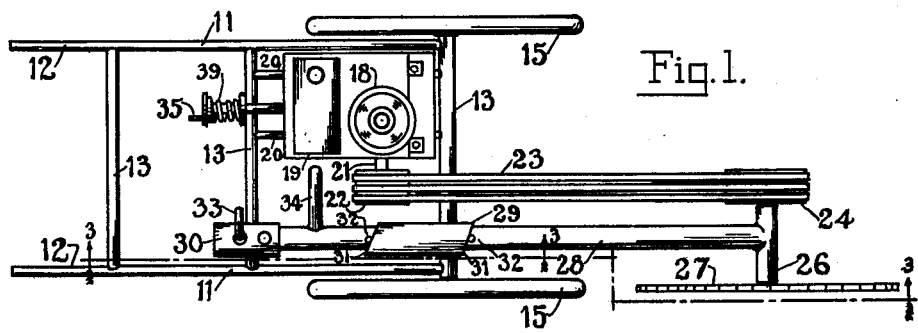
Fig. 1 is a plan view of an embodiment of my invention with the belts in open drive position.

Referring more specifically to the drawings, the side bars 11 of the saw carriage rise toward the rear to form the handles 12. The side bars 11 are joined at various points by cross bars 13. The axle 14, carrying the traction wheels 15, is mounted upon suitable brace rods 16, 17.

The engine 18, which furnishes power for the saw blade, is mounted upon a base 19 which is carried by longitudinal rods 20 mounted on cross braces 13. The engine 18 has a laterally projecting shaft 21 provided with a pulley 22 suitable for receiving one or more V-belts 23. The belts 23 extend forwardly and around the driven pulley 24 which is similar to the driving pulley 22 and is mounted on one end of shaft 25 which is journaled in transverse bearing 26.

Figure 2:
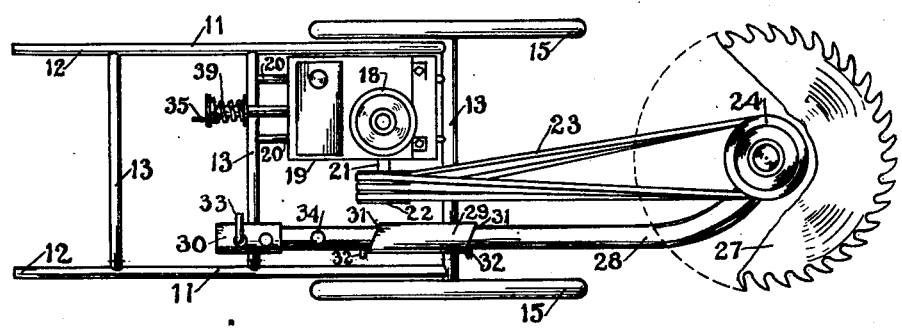
Fig. 2 is a similar view showing the belts in one-quarter turn drive position.
Figure 3:
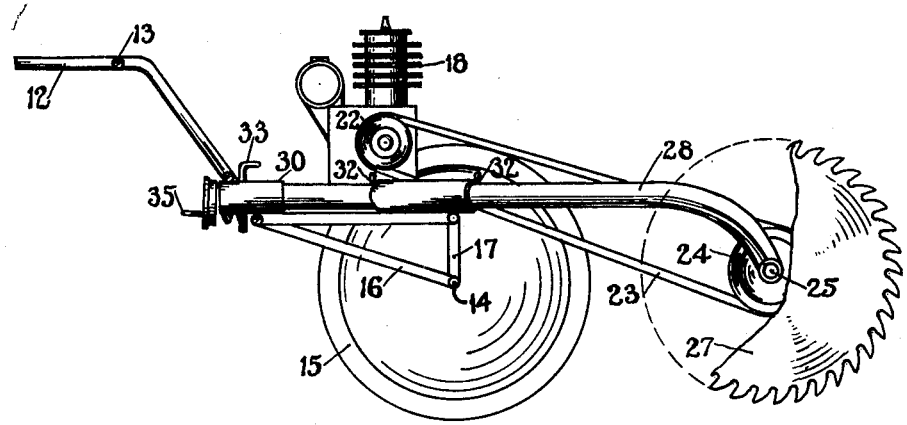
Fig. 3 is a side view, taken along the line 3—3 in Fig. 1, with parts broken away.
Figure 4:
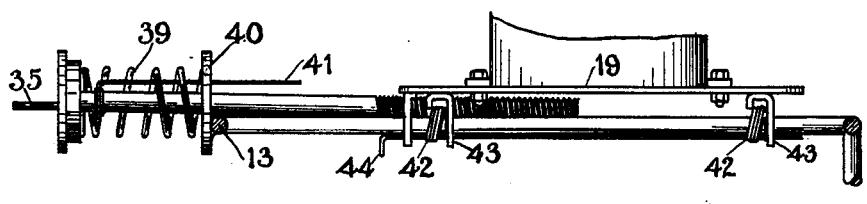
Fig. 4 is a detail side view showing the means for adjusting the position of the motor base.
Figure 5:
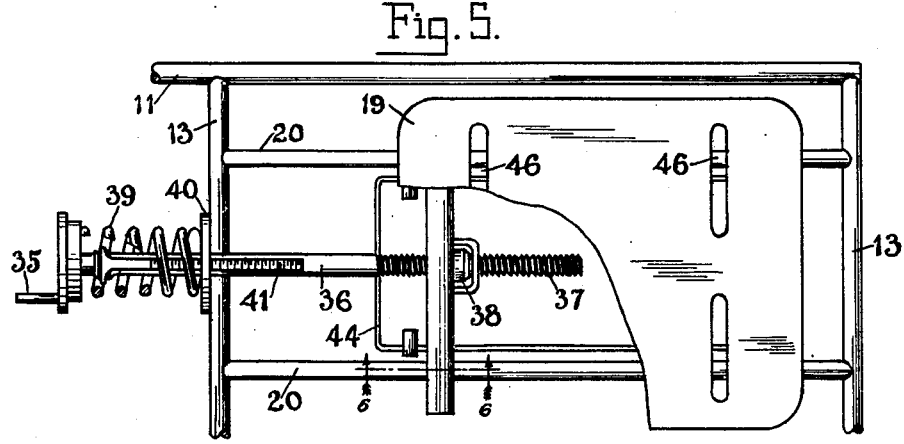
Fig. 5 is a plan view, partly in section, of the detail shown in Fig. 4.
Figure 6:
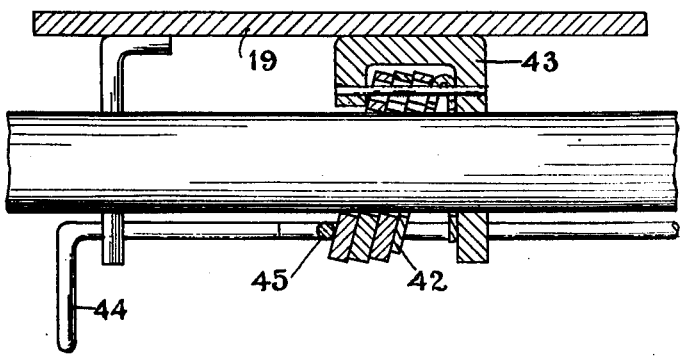
Fig. 6 is an enlarged detail longitudinal section taken along the line 6—6, in Fig. 5.

The saw blade 27 is carried on the end of shaft 25 opposite the pulley 24. Transverse bearing 26 is carried by longitudinal shaft 28 which is bent near its forward end, as shown in Figs. 2 and 3. Shaft 28 is journaled in bearings 29 and 30 which are securely mounted, as by welding, on cross bars 13.

The ends of bearing 29 are arranged to form cam surfaces 31 which cooperate with the pins 32, fixed in shaft 28, to shorten the forwardly projecting length of shaft 28 when it is rotated to angular drive position such as the one-quarter turn drive position shown in Fig. 2, and to lengthen it again when it is returned to the open drive position shown in Figs. 1 and 3. Locking pin 33 is inserted into cooperating holes drilled in bearing 30 and shaft 28 to lock the shaft in either operating position, the handle 34 is provided for rotating the shaft 28.

Handle 35 is provided for maintaining proper tension in the belts. This handle is mounted on rod 36 which is screw threaded, as at 37 for cooperation with the threaded thrust nut 38 to move the motor base 19 backward or forward on the rods 20. The spring 39 is coiled about the rod 36 between the handle 35 and an abutment 40 on a cross brace 13. This spring urges the motor base rearwardly against the tension in the belts, and the scale 41 is provided for determining when the proper spring tension is on the belts. The scale is freely mounted on the rod 36 and is held against rotation by the walls of the slot in which it passes through abutment 40.

Jack blades 42 prevent the motor from being pulled forward by any increase in tension on the belts due to an overload. These blades are mounted in holders 43 which are fixed to the bottom of the motor base 19 and arranged to slide along the rods 20. The blades 42 permit the motor base to be slid rearwardly to apply tension to the belts, but they prevent it from sliding forward to relieve the tension until released by pressure on the handle 44 which pushes the release pin 45 against the blades 42 to straighten them so that their sharp leading edges will not bite into the rods 20.

Slots 46 in motor base 19 permit lateral adjustment of the motor 18 to assure axial alignment of the pulleys 22 and 24 in the open drive position.

In operation it is only necessary to swing the handle 34 to rotate the saw blade 27 to vertical position. The shaft 28 is automatically extended because of the camming action of the bearing 29. Pressure on the handle 44 releases the jack blades and permits the motor to be pushed forward for ease in applying the belts 23 to the pulleys 22, 24. Then by turning the crank handle 35 and reading the scale 41 the proper tension may be adjusted on the belts. In this position the pulleys 22, 24 are in axial alignment; and with proper tension adjusted on the belts, the belts will have long life. The jack blades 42 prevent the motor from being pulled forward in case of an overload. If the motor were allowed to be pulled forward, or if the tension on the belts were reduced at such times by any means, undue slippage would occur and unduly shorten the lift of the belts.

When the saw blade is rotated to the horizontal position, as shown in Fig. 2, the belts are twisted one-quarter turn and the projecting length of shaft 28 is automatically shortened, because of the camming action of bearing 29, to compensate for the twisted length of the belts. Moreover, the pulleys 22, 24 are no longer in axial alignment. According to my invention, by rotation of the bent shaft 28, the pulley 24 undergoes not merely a rotary motion about its own axis, but it is swung into such position, as shown in Fig. 2, that the axis of 22 now passes through pulley 24 at a point approximately one-fifth of the distance from the periphery of the pulley to its center. By this arrangement of the pulleys, the optimum ratio is obtained between the belts' angle of approach and angle of departure from the pulleys. This ratio is directly related to the ratio of the tension in the slack side of the belt to the tension in the tight side of the belt and is approximately 1 to 5 and between the limits of 1 to 3 and 1 to 15.

Tension in the spring 39 may be adjusted at any time to compensate for wear or stretching of the belts 23.

It will be obvious to those skilled in the art that details of my invention will be found useful not only in the organization of equipment shown but also in various other applications within the scope of the appended claims.

Having thus described my invention, I claim:

1. Belt drive means including in combination, a driving pulley and a driven pulley each having peripheral belt grooves, belt means engaging in said grooves and connecting said driving pulley and said driven pulley, motive power means for driving said driving pulley, said motive power means being mounted for movement toward or away from the driven pulley, means for rigidly holding said motive power means against movement toward said driven pulley, resilient means for urging said motive power means away from said driven pulley and against the tension in said belt means, at least one of said pulleys being mounted for rotation to bring said pulleys from open drive position to one-quarter turn drive position and into such relation with each other that the angles of the belt means approaching and leaving each of the pulleys with reference to the center line of the grooves of the other pulley are in the ratio of substantially 1 to 5, and means for changing the distance between said pulleys upon rotation from open drive to one-quarter turn drive and vice versa to compensate for the twist in said belt means.

2. Apparatus according to claim 1 in which the ratio of the angles of the belt means is between the limits of 1 to 3 and 1 to 15.

3. In combination, a driving pulley and a driven pulley, belt means connecting said driving pulley and said driven pulley, motive power means for driving said driving pulley, said motive power means being mounted for movement toward or away from the driven pulley, means releasable by movement of said motive power means away from said driven pulley for rigidly holding said motive power means from movement toward said driven pulley, and resilient means for urging said motive power means away from said driven pulley and against the tension in said belt means.

4. A portable power saw comprising a frame including a horizontal front part and a rear part rising to form handle means for guiding the saw, said frame being mounted upon wheels for locomotion, a motor mounted on said frame adjacent one side thereof and having a drive shaft extending transversely of said frame toward the opposite side thereof, a driving pulley having peripheral belt grooves mounted on said drive shaft, an elongated shaft rotatably supported at one end in bearings mounted on said frame adjacent said opposite side and extended forwardly and downwardly therefrom, a transverse bearing carried by the forwardly extending part of said elongated shaft, a rotary shaft journaled in said transverse bearing and carrying a circular saw at the outer end thereof, a driven pulley carried by the inner end of said rotary shaft in alignment with said driving pulley in open drive position and having peripheral belt grooves, a belt drive engaging in said grooves and extending between said driving pulley and said driven pulley, means for rotating said elongated shaft to bring said driven pulley into one-quarter turn drive position, said elongated shaft being so arranged and constructed that when rotated to bring the driven pulley into one-quarter turn drive position the saw is moved from a low vertical position at one side of the frame to a higher horizontal position centrally of the frame and the driven pulley is also placed in such relation with the driving pulley that the angles of the belt drive approaching and leaving each of the pulleys with reference to the center line of the grooves of the other pulley are in the ratio of substantially 1 to 5, said motor being slidably mounted for movement toward or away from the driven pulley, releasable means for rigidly holding said motor against movement toward said driven pulley, and resilient means for urging said motor away from said driven pulley and against the tension in said belt drive.

HAROLD R. POMEROY.

References Cited in the file of this patent

UNITED STATES PATENTS

| Number | Name | Date |
|---|---|---|
| 1,878,983 | Harris | Sept. 20, 1932 |
| 2,329,185 | Coddington | Sept. 14, 1943 |
| 2,407,028 | McLean | Sept. 3, 1946 |
| 2,439,607 | Irwin | Apr. 13, 1948 |
| 2,455,369 | Kuykendall | Dec. 7, 1948 |

FOREIGN PATENTS

| Number | Country | Date |
|---|---|---|
| 27,542 | Sweden | Oct. 16, 1909 |
| 118,961 | Australia | Sept. 12, 1944 |